(12) United States Patent
Koizumi

(10) Patent No.: US 11,601,751 B2
(45) Date of Patent: Mar. 7, 2023

(54) DISPLAY CONTROL DEVICE AND DISPLAY CONTROL METHOD

(71) Applicant: SONY CORPORATION, Tokyo (JP)

(72) Inventor: Tatsuya Koizumi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 311 days.

(21) Appl. No.: 16/642,112

(22) PCT Filed: Jul. 25, 2018

(86) PCT No.: PCT/JP2018/027918
§ 371 (c)(1),
(2) Date: Feb. 26, 2020

(87) PCT Pub. No.: WO2019/049544
PCT Pub. Date: Mar. 14, 2019

(65) Prior Publication Data
US 2020/0204914 A1    Jun. 25, 2020

(30) Foreign Application Priority Data

Sep. 8, 2017   (JP) .............................. JP2017-172687

(51) Int. Cl.
*H04R 3/04* (2006.01)
*G01H 3/00* (2006.01)
*G01H 3/06* (2006.01)

(52) U.S. Cl.
CPC .............. *H04R 3/04* (2013.01); *G01H 3/005* (2013.01); *G01H 3/06* (2013.01); *H04R 2430/01* (2013.01); *H04R 2499/15* (2013.01)

(58) Field of Classification Search
CPC .......... G06F 3/165; G06F 3/0484; G06F 3/14; H04R 1/403; H04R 3/12; H04R 2201/403; H04R 2430/20; H04R 2499/15; H04R 29/008; H04R 1/40; H04R 3/00; H04S 3/02; H04S 7/302; H04S 7/40; H04S 2400/11; H04S 2400/00; H04S 2420/13; H04S 3/00; H04S 7/00
USPC ............. 381/61, 119; 715/716; 84/625, 660; 369/3, 4
See application file for complete search history.

(56) References Cited

U.S. PATENT DOCUMENTS

| | | | |
|---|---|---|---|
| 9,185,509 B2 * | 11/2015 | Myllyla | ............... H04R 29/008 |
| 2007/0014540 A1 | 1/2007 | Iida et al. | |
| 2009/0052677 A1 * | 2/2009 | Smith | ................... H04R 29/008 381/56 |

(Continued)

FOREIGN PATENT DOCUMENTS

| | | |
|---|---|---|
| CN | 1901082 A | 1/2007 |
| JP | 2007-025001 A | 2/2007 |

OTHER PUBLICATIONS

International Search Report and Written Opinion of PCT Application No. PCT/JP2018/027918, dated Sep. 18, 2018, 06 pages of ISRWO.

(Continued)

*Primary Examiner* — Xu Mei
(74) *Attorney, Agent, or Firm* — Chip Law Group

(57) ABSTRACT

A display control device includes a control unit that displays a sound pressure level distribution of predetermined sound data and a recordable range corresponding to a quantization bit depth during recording of the sound data on a display unit.

17 Claims, 7 Drawing Sheets

(56) References Cited

U.S. PATENT DOCUMENTS

2011/0273478 A1\* 11/2011 Culpi .................... G06T 11/206
   345/662
2016/0011850 A1\* 1/2016 Sheen .................... G06F 3/162
   715/709

OTHER PUBLICATIONS

"Chapter 36:Maxim", Audio Plug-Ins Guide, Version 9.0, Avid Techonology, Inc, Chapter 36, Sep. 6, 2018, pp. 243-248.
Audio Plug-Ins Guide Version 9.0, Avid Technology, Inc. [On-line], 2010, and Chapter 36 pp. 243-248.
Office Action for JP Application 2019-540817, dated Jun. 7, 2022, pp. 2.

\* cited by examiner

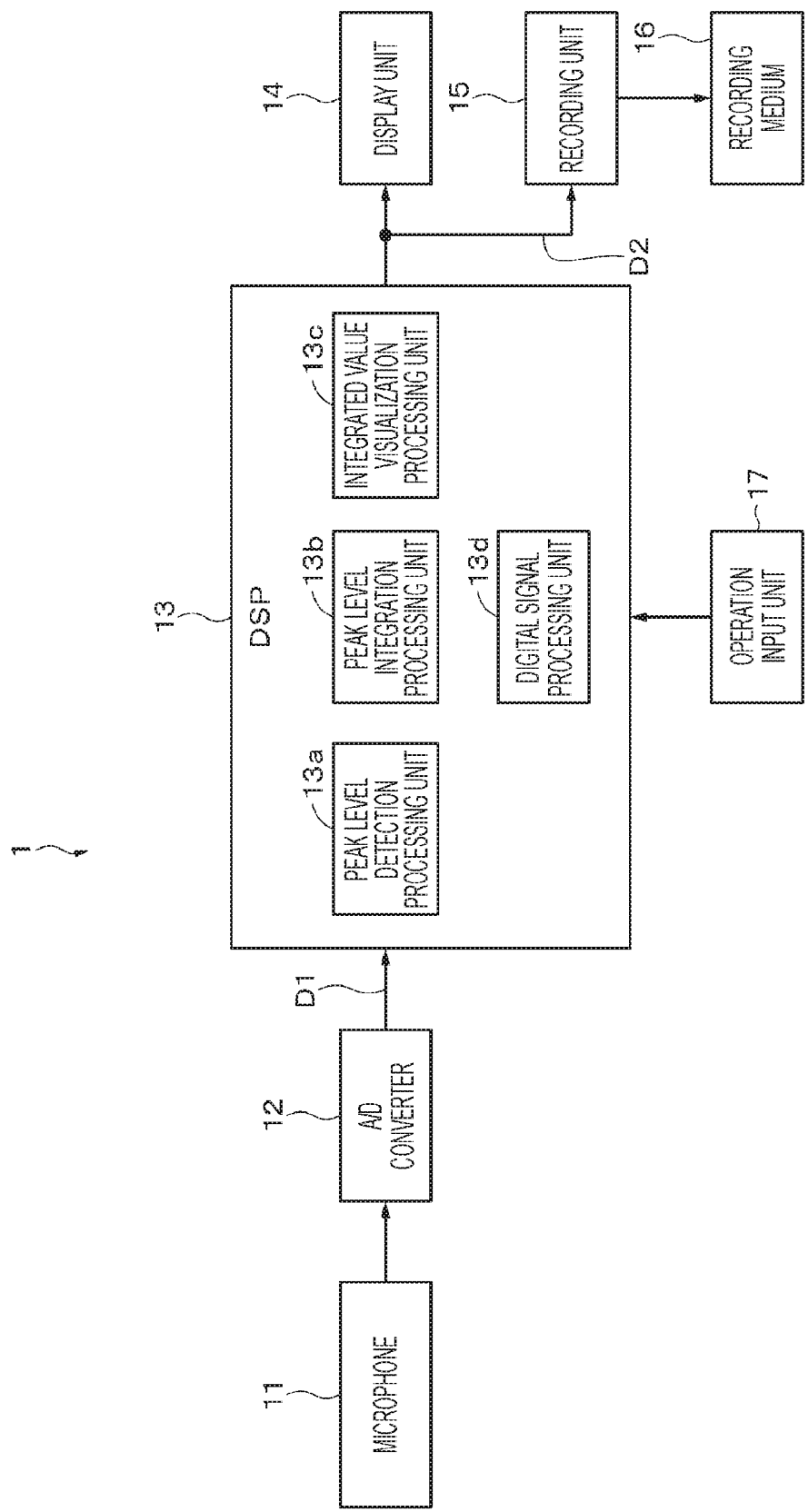

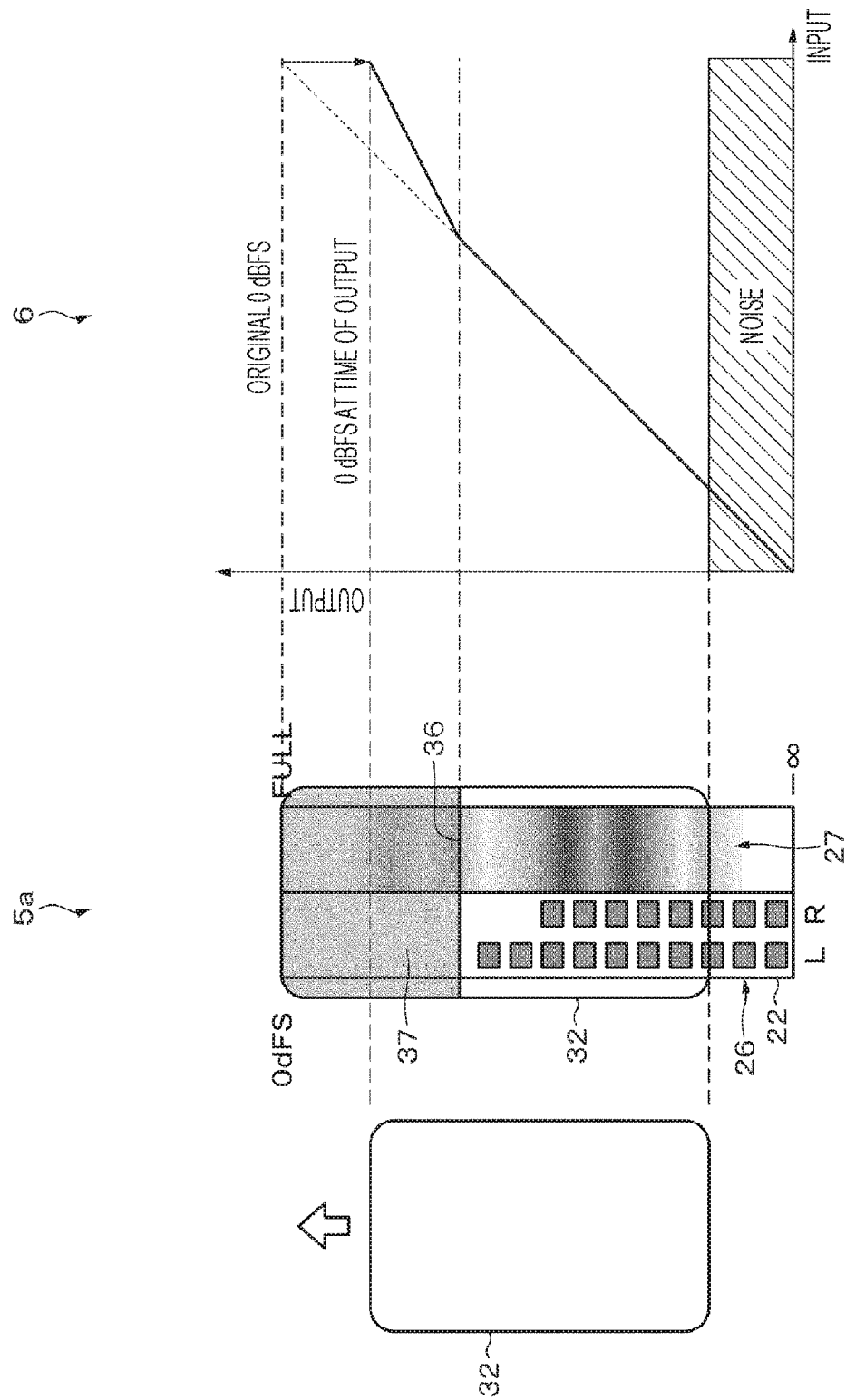

DISPLAY CONTROL DEVICE AND DISPLAY CONTROL METHOD

CROSS REFERENCE TO RELATED APPLICATIONS

This application is a U.S. National Phase of International Patent Application No. PCT/JP2018/027918 filed on Jul. 25, 2018, which claims priority benefit of Japanese Patent Application No. JP 2017-172687 filed in the Japan Patent Office on Sep. 8, 2017. Each of the above-referenced applications is hereby incorporated herein by reference in its entirety.

TECHNICAL FIELD

The present disclosure relates to a display control device, a display control method, and a program.

BACKGROUND ART

As one of displays regarding input sound, a peak level meter is known that displays sound pressure and a peak value in real time (see, for example, Patent Document 1).

CITATION LIST

Patent Document

Patent Document 1: Japanese Patent Application Laid-Open No. 2007-25001

SUMMARY OF THE INVENTION

Problems to be Solved by the Invention

There has been a problem that users can know only about an instantaneous maximum sound pressure (peak level), with the peak level meter.

Thus, it is an object of the present disclosure to provide a display control device, a display control method, and a program enabled to perform appropriate display for input sound.

Solutions to Problems

The present disclosure is, for example,
a display control device including
a control unit that displays a sound pressure level distribution of predetermined sound data and a recordable range corresponding to a quantization bit depth during recording of the sound data on a display unit.

The present disclosure is, for example,
a display control method including
displaying a sound pressure level distribution of predetermined sound data and a recordable range corresponding to a quantization bit depth during recording of the sound data on a display unit, by a control unit.

The present disclosure is, for example,
a program causing a computer to execute a display control method including
displaying a sound pressure level distribution of predetermined sound data and a recordable range corresponding to a quantization bit depth during recording of the sound data on a display unit, by a control unit.

Effects of the Invention

According to at least an embodiment of the present disclosure, it is possible to appropriately display input sound. Note that, the effect described here is not necessarily limited, and may be any effect described in the present disclosure. Furthermore, the contents of the present disclosure are not to be construed as being limited by the exemplified effect.

BRIEF DESCRIPTION OF DRAWINGS

FIG. 1 is a block diagram illustrating a configuration example of a display control device according to an embodiment.

FIG. 7 is a diagram illustrating a display example and the like according to a second embodiment.

MODE FOR CARRYING OUT THE INVENTION

Figures 2A, 2B:
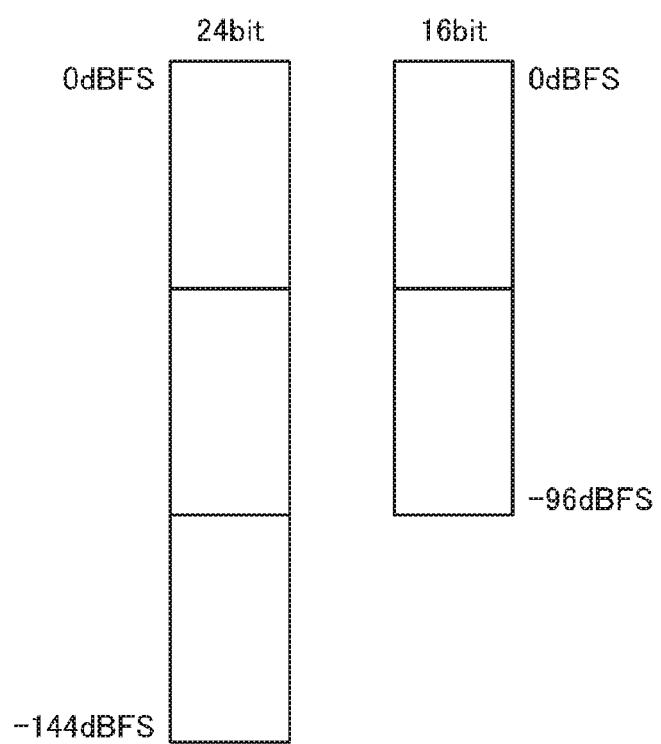
FIGS. 2A and 2B are diagrams schematically illustrating a recordable range corresponding to a quantization bit depth.

Hereinafter, an embodiment and the like of the present disclosure will be described with reference to the drawings. Note that, description will be made in the following order.
<1. First Embodiment>
<2. Second Embodiment>
<3. Modifications>

The embodiment and the like described below are preferred specific examples of the present disclosure, and the contents of the present disclosure are not limited to the embodiment and the like.

1. First Embodiment

[Configuration Example of a Display Control Device]
FIG. 1 is a block diagram illustrating a configuration example of a display control device (display control device 1) according to a first embodiment. The display control device 1 can be applied to, for example, devices enabled to collect sound, specifically, an imaging device, a smartphone, a portable sound recording device, a wearable device, and the like.

The display control device 1 includes, for example, a microphone 11, an analog to digital (A/D) converter 12, a digital signal processor (DSP) 13, a display unit 14, a recording unit 15, a recording medium 16, and an operation input unit 17.

The microphone 11 collects ambient sound and may be a microphone incorporated in the display control device 1 or a microphone (external microphone) detachable from the display control device 1. The sound may be any sound as far as it is sound, such as music, human voice, and natural sound. The microphone 11 outputs predetermined analog sound data corresponding to the collected sound to the A/D converter 12.

The A/D converter 12 converts the analog sound data supplied from the microphone 11 into digital sound data. The A/D converter 12 samples the analog sound data at a high quantization bit depth, for example, 24 bits. Note that, the sampling frequency is set to an arbitrary value (for example, 96 kilohertz (kHz)). Sound data with a sampling frequency of 96 kHz and a quantization bit depth of 24 bits may be referred to as high-res (abbreviation of high resolution). The A/D converter 12 outputs digital sound data obtained by AD conversion with a quantization bit depth of 24 bits as digital sound data D1.

The DSP 13 that is an example of a control unit controls each unit of the display control device 1. The DSP 13 includes, for example, a peak level detection processing unit 13*a*, a peak level integration processing unit 13*b*, an integrated value visualization processing unit 13*c*, and a digital signal processing unit 13*d*, as functions. The peak level detection processing unit 13*a* samples the digital sound data D1 in a certain unit time, and detects a peak level of the digital sound data D1 at the time of sampling. The peak level detection cycle can be set to an appropriate value. The processing result of the peak level detection processing unit 13*a* is displayed as a peak level meter on the display unit 14.

The peak level integration processing unit 13*b* integrates the frequency of occurrence of the peak level per unit time of the digital sound data D1 on the basis of the detection result by the peak level detection processing unit 13*a*. The integrated value visualization processing unit 13*c* acquires a sound pressure level distribution for visualizing the frequency of occurrence of the peak level on the basis of the processing result of the peak level integration processing unit 13*b*. Then, the DSP 13 controls the display unit 14 to display the sound pressure level distribution on the display unit 14.

The digital signal processing unit 13*d* performs various types of digital signal processing on the digital sound data D1. Examples of the digital signal processing include Fast Fourier Transform (FFT) processing, digital filtering processing, equalizer processing, and the like. Furthermore, the digital signal processing unit 13*d* according to the present embodiment operates as a compressor, and also operates as a conversion unit that converts the digital sound data D1 of 24 bits into digital sound data D2 of a quantization bit depth (for example, 16 bits) adapted to recording.

The display unit 14 is a display that displays predetermined information depending on the control of the DSP 13. Examples of the display include a liquid crystal display (LCD), an organic electro luminescence (EL), and the like. Details of the information displayed on the display unit 14 will be described later.

The recording unit 15 records digital sound data on the recording medium 16. The recording unit 15 records the digital sound data D2 supplied from the DSP 13, for example. The digital sound data D2 is data obtained by converting the digital sound data D1 with a quantization bit depth of 16 bits.

The recording medium 16 may be a hard disk and the like incorporated in the display control device 1, may be a portable memory such as a universal serial bus (USB) memory, an optical disk, and an SD card, or may be any medium as far as it can record at least sound data corresponding to the sound collected by the microphone 11.

The operation input unit 17 is a collective term for user interfaces such as a button provided in the display control device 1. The operation input unit 17 may be a mechanical switch such as a button, may be a touch screen, or may be both of them. Furthermore, the operation input unit 17 may be a remote control device, a tablet computer, a smartphone, or the like enabled to remotely operate the display control device 1. In the present embodiment, the display unit 14 functions as a touch screen. The operation input unit 17 generates an operation signal depending on an operation input made to the operation input unit 17, and supplies the operation signal to the DSP 13. The DSP 13 performs processing according to the operation signal.

[Problems to be Considered when Sound Data is Recorded]

Here, description will be made for problems to be considered when sound data is recorded. As described above, the peak level meter can display only a peak level at that moment. Thus, the user has not been able to intuitively know, for example, the range of the sound pressure of the sound source (input sound) being recorded, and the distribution of the frequency of occurrence of the peak level. When conversion is performed from a high (large) quantization bit depth to a low (small) quantization bit depth for recording on the recording medium 16, it may be necessary to perform setting regarding the recording range and compressor, but the information provided by the peak level meter has been insufficient as information for performing effective setting. For this reason, at present, compression is performed at a certain fixed ratio, or correction is automatically performed by matching the value only to the peak value. Note that, the conversion is performed from digital sound data sampled with a high quantization bit depth to digital sound data sampled with a low quantization bit depth depending on a standard supported by the recording medium 16, a remaining recording capacity of the recording medium 16, user settings, and the like. On the basis of the above points, embodiments of the present disclosure will be further described.

[Display Regarding Recordable Range]

(Setting of 0 dBFS)

Next, display regarding a recordable range will be described with reference to FIGS. 2A, 2B, 3A, 3B, 4A, and, 4B. FIG. 2A is a diagram schematically illustrating a dynamic range of 24 bits with a rectangular frame. Furthermore, FIG. 2B is a diagram schematically illustrating a dynamic range of 16 bits with a rectangular frame. In FIGS. 2A and 2B, the top side of the rectangle corresponds to 0 decibel full scale (hereinafter, written as 0 dBFS as appropriate) that is the maximum signal level, and the bottom side corresponds to the noise floor. The dynamic range has a noise floor of −144 dBFS in the case of 24 bits, and has a noise floor of −96 dBFS in the case of 16 bits. Since the dynamic range is generally defined by the difference between the maximum signal level and the noise floor, the length in the longitudinal direction corresponds to the dynamic range in each of FIGS. 2A and 2B. Signals outside the dynamic range, in other words, signals below the noise floor cannot be expressed (cannot be recorded).

Figures 3A, 3B:
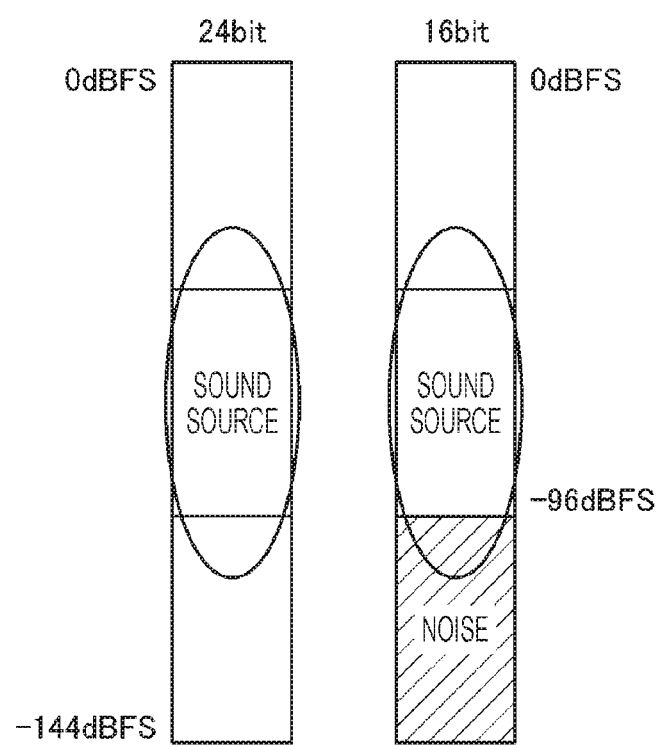
FIGS. 3A and 3B are diagrams schematically illustrating the recordable range corresponding to the quantization bit depth and a range of signals included in a sound source.

FIGS. 3A and 3B are diagrams schematically illustrating a range of signals included in a certain sound source with respect to the dynamic range illustrated in FIGS. 2A and 2B. In FIGS. 3A and 3B, the range of the sound source is indicated by an ellipse. In the case of 24 bits, it is possible to record the full range of the sound source exemplified in FIG. 3A. In the case of 16 bits, signals below −96 dBFS of the sound source exemplified in FIG. 3B cannot be recorded (note that, in FIG. 3B, a range that cannot be recorded (a range smaller than −96 dBFS, more specifically, a range of from −96 dFS to −144 dFS) is shaded and indicated as noise.).

Figures 4A, 4B:
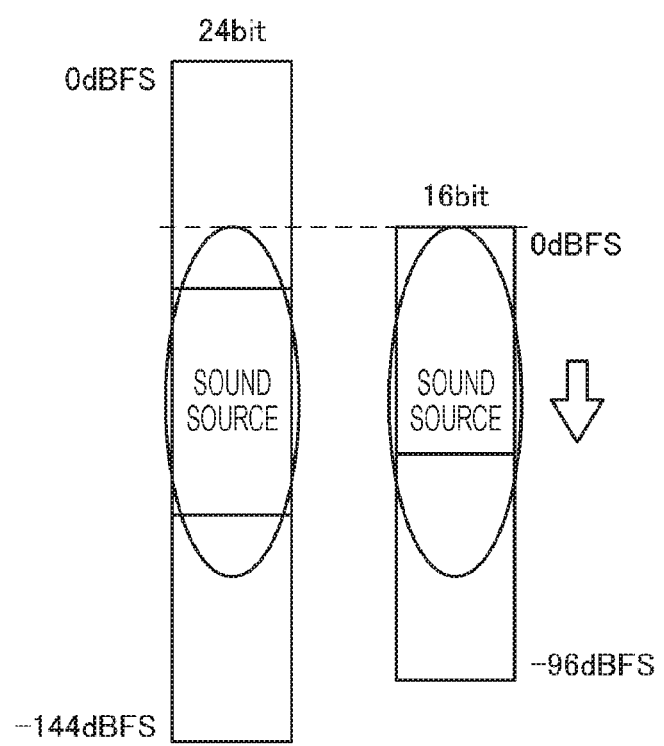
FIGS. 4A and 4B are diagrams illustrating an example in which 0 dBFS corresponding to the quantization bit depth is adjusted.

By the way, in the case of the sound source exemplified in FIG. 4A, there is no signal near 0 dBFS. Thus, as schematically illustrated in FIG. 4B, if recording is performed by changing a position of 0 dBFS to an appropriate position, all signals included in the sound source can be recorded.

(Display Example)

As described above, for example, in a case where sound data of a sound source is sampled with 24 bits and recorded with 16 bits, the sound data can be appropriately recorded by setting the position of 0 dBFS depending on characteristics of the sound source. Thus, if the characteristics of the sound source are provided to the user, for example, by display, the user can appropriately set the position of 0 dBFS with reference to the display.

Figure 5:
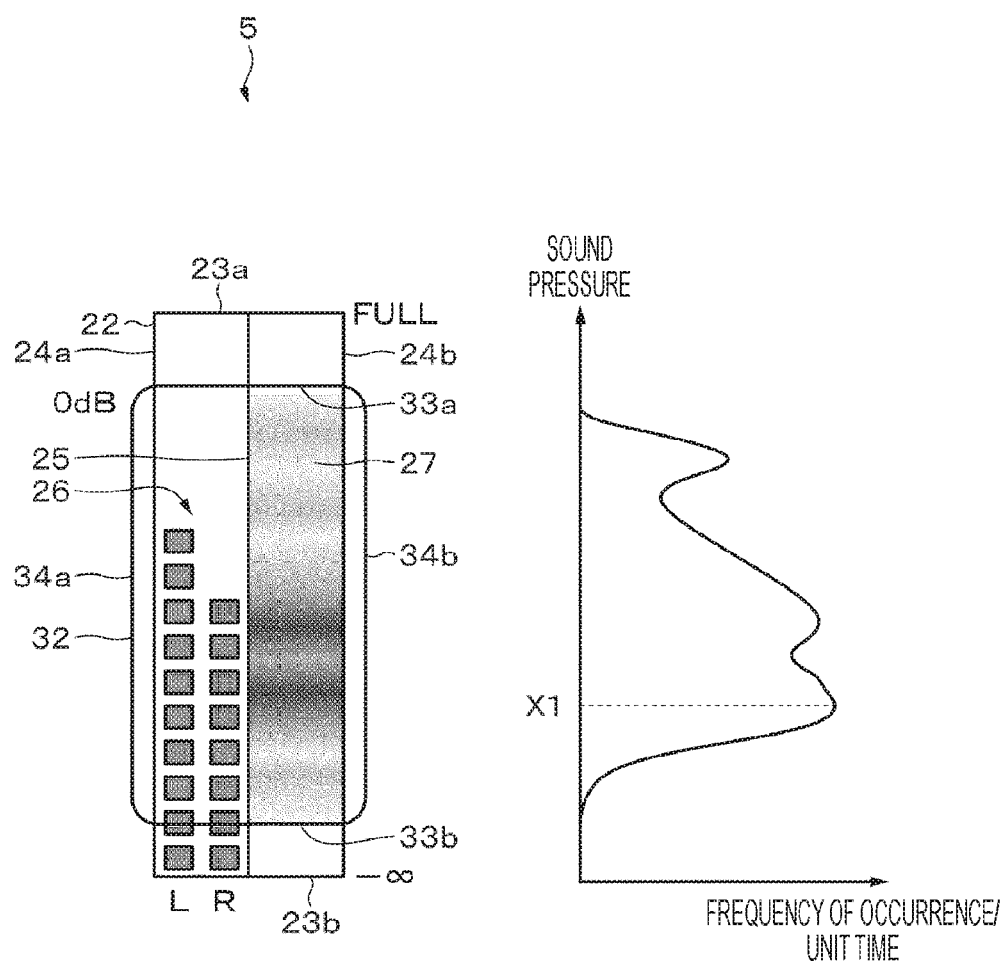
FIG. 5 is a diagram illustrating a display example and the like according to a first embodiment.

FIG. 5 illustrates a display example (display 5) displayed in the first embodiment. The display 5 is displayed on the display unit 14, for example. The display 5 includes, for example, a frame 22 having a rectangular shape, and the frame 22 has sides 23a and 23b facing each other, in the short side direction, and sides 24a and 24b facing each other, in the longitudinal direction. A character "FULL" is displayed on the right side of the side 23a. The side 23a corresponds to 0 dBFS corresponding to 24 bits. Furthermore, "−∞" is described on the right side of the side 23b, which corresponds to digital 0 (in this example, a noise floor (−144 dBFS) corresponding to 24 bits).

Furthermore, the frame 22 includes a division side 25 extending in the longitudinal direction near the center. The area surrounded by the frame 22 is divided into two areas in the left-right direction by the division side 25. In the left area, a peak level meter 26 is displayed that displays a volume level of a left channel (L) and a volume level of a right channel (R).

Furthermore, a sound pressure level distribution display 27 is displayed in the right area. An example will be described of the sound pressure level distribution display 27. A graph described on the right side in FIG. 5 is a graph illustrating a sound pressure level distribution of a certain sound source. In the graph, the horizontal axis indicates the frequency of occurrence of the peak level per unit time, and the vertical axis indicates the sound pressure. In the illustrated example, the frequency of occurrence of a peak level X1 is the highest. The sound pressure level distribution display 27 according to the present embodiment represents the sound pressure level distribution indicated by the graph using colors. For example, a plurality of threshold values is set for the frequency of occurrence, and red, orange, yellow, green, and colorless are displayed in descending order of the frequency of occurrence, whereby the sound pressure level distribution is represented. Instead of different colors, the sound pressure level distribution may be represented by changing color shading so that the color becomes darker in descending order of the frequency of occurrence. Note that, the graph illustrated in FIG. 5 may be displayed together with the sound pressure level distribution display 27, or may be displayed instead of the sound pressure level distribution display 27. That is, the sound pressure level distribution display 27 may be displayed as a graph.

Moreover, the display 5 includes a frame 32 having a rectangular shape. The frame 32 is displayed to be superimposed on the frame 22. The superimposition in the present embodiment means that at least a part of the frames overlap or intersect each other. The frame 32 has sides 33a and 33b facing each other, in the short side direction, and sides 34a and 34b facing each other, in the longitudinal direction. Each of the sides 33a and 33b intersects the sides 24a and 24b of the frame 32. On the left side of the side 33a, 0 dB is displayed. That is, the side 33a corresponds to 0 dBFS of 16 bits. Furthermore, the side 33b corresponds to the noise floor (−96 dB) of 16 bits. Therefore, the sound pressure level distribution display 27 and the recordable range corresponding to 16 bits that is the quantization bit depth during recording of the sound data are displayed at respective positions close to each other. Specific examples of the respective positions close to each other include respective positions where the sound pressure level distribution display 27 and the recordable range are displayed so that at least a part of the sound pressure level distribution display 27 is included in the display of the recordable range.

The user performs input operation to the operation input unit 17, thereby moving the entire frame 32, for example, in the vertical direction. For example, if the frame 32 is moved so that the entire colored portion in the sound pressure level distribution display 27 is located within the frame 32, the dynamic range becomes sufficient for the band of sound to be recorded. Furthermore, even in a case where it is not possible to locate the entire colored portion within the frame 32, if the position of the frame 32 is adjusted to include a color corresponding to a high frequency of occurrence (for example, red or the like), it becomes possible to set a dynamic range suitable for characteristics (for example, a sound pressure distribution) of the sound to be recorded. As described above, the sound pressure level distribution display 27 is displayed as one index, and the recordable range at 16 bits is displayed, whereby it is possible to perform recording effectively using the recordable range at 16 bits.

[Operation Example]

Next, an operation example will be described of the display control device 1. Sound is collected by the microphone 11. Analog sound data output from the microphone 11 is sampled by the A/D converter 12 with a quantization bit depth of 24 bits and subjected to AD conversion. The digital sound data D1 output from the A/D converter 12 is supplied to the DSP 13.

The peak level detection processing unit 13a of the DSP 13 detects a peak level of the digital sound data D1. The DSP 13 controls the display unit 14 depending on the detection result by the peak level detection processing unit 13a, and the peak level meter 26 is displayed on the display unit 14 depending on the control.

Furthermore, the frequency of occurrence of the peak level is integrated by the peak level integration processing unit 13b, and depending on the result, the integrated value visualization processing unit 13c acquires data (for example, a sound pressure and frequency of occurrence per unit time corresponding to the sound pressure) for displaying the sound pressure level distribution display. Then, the DSP 13 controls the display unit 14 on the basis of the acquired data, and the sound pressure level distribution display 27 is displayed on the display unit 14 depending on the control. Furthermore, the DSP 13 displays the frame 22 and the frame 32 on the display unit 14.

The position of the frame 32 is adjusted by operation using the operation input unit 17 by the user. As a result of the adjustment, a dynamic range is set corresponding to 16 bits. On the basis of the set dynamic range, the digital signal processing unit 13d performs conversion of the digital sound data D1 again with the quantization bit depth of 16 bits, and outputs the result as the digital sound data D2. The digital sound data D2 is recorded on the recording medium 16 by the recording unit 15.

[Effects]

According to the first embodiment described above, the following effects can be obtained, for example.

In a case where the sound is sampled with a higher quantization bit depth than that to be actually recorded on the recording medium and then recorded with a lower quantization bit depth, the sound pressure level distribution of the sound to be recorded can be displayed to the user, and the recordable range can be displayed. Thus, the user can appropriately set the recordable range corresponding to the quantization bit depth depending on the characteristics of the sound to be recorded, and effective recording is possible.

2. Second Embodiment

Next, a second embodiment will be described. Note that, the matters described in the first embodiment can be applied to the second embodiment unless otherwise specified, and similarly, the same reference numerals are given to the configuration of the same quality, and redundant description is omitted. As a display control device according to the second embodiment, the display control device 1 described in the first embodiment can be applied.

Figure 6:
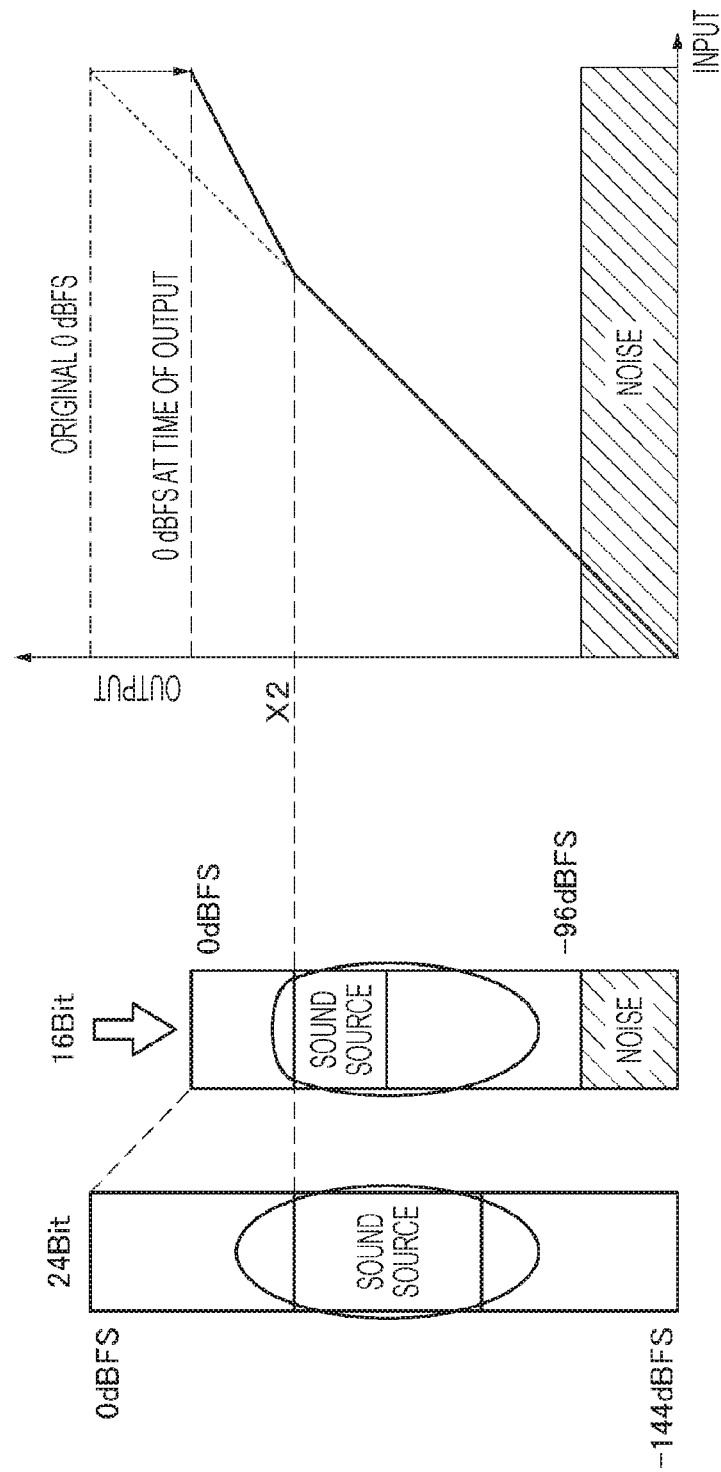
FIG. 6 is a diagram referred to when a method for compressing a dynamic range is explained.

The second embodiment is an example in which the DSP 13 controls the display unit 14 to display information regarding a compressor. As illustrated in FIG. 6, a method is known for compressing the dynamic range by applying a compressor. For example, the compressor is applied when the input exceeds a certain level, and the output corresponding to the input is compressed and recorded. In FIG. 6, an operation start point at which the compressor is applied is schematically illustrated as X2.

A display example of the information regarding the compressor will be described with reference to FIG. 7. In FIG. 7, a diagram located at the center is a display example (display 5a) of the information regarding the compressor. Note that, in the display 5a, since displays such as the display of the frame 22, the peak level meter 26, and the sound pressure level distribution display 27 are similar to those in the display 5 described above, redundant description is omitted, and a part of reference signs is omitted in illustration. In FIG. 7, the diagram on the left side illustrates the frame 32 in a case where the compressor is not applied. Furthermore, the diagram on the right side is a graph 6 illustrating an operation example of the compressor, in which the horizontal axis indicates the input and the vertical axis indicates the output. Note that, the graph 6 is not displayed on the display unit 14 in the present embodiment, but may be displayed.

For example, the information regarding the compressor is displayed depending on a mode or operation for turning on the display of the information regarding the compressor. The display 5a includes a side 36 extending in the horizontal direction within the frame 32 as the information regarding the compressor. Furthermore, the display 5a includes a colored portion 37 in which an area above the side 36 is colored in an area within the frame 32, as the information regarding the compressor. The color of the colored portion 37 can be any color such as red. The colored portion 37 indicates a range to which the compressor is applied (a range to be compressed). Thus, the side 36 that is an end of the colored portion 37 indicates the operation start point of the compressor.

While referring to the sound pressure level distribution display 27, the user moves the side 36 in the vertical direction to adjust the operation start point of the compressor. For example, a position of the side 36 is set so that a portion where the frequency of occurrence of the peak level becomes low in the sound pressure level distribution display 27, in other words, the signal component included in the colored portion 37 does not increase. Therefore, an appropriate portion (level) can be set as the operation start point of the compressor in accordance with the characteristics of the sound to be recorded. The digital signal processing unit 13d operates the compressor on the basis of the operation start point of the compressor set by the side 36.

Note that, as described above, since the recordable range is increased by operating the compressor, the length of the frame 32 in the vertical direction changes depending on the position of the side 36. That is, in the present embodiment, the recordable range corresponding to 16 bits and the information regarding the compressor are displayed by the frame 32 whose shape changes.

Processing may be performed in which the horizontal width of the frame 32 is made to be adjustable, and for example, the compression ratio in the compressor is increased as the horizontal width is increased, and the compression ratio in the compressor is decreased as the horizontal width is decreased. Therefore, the setting regarding the compression ratio of the compressor can also be performed easily. Furthermore, by referring to the sound pressure level distribution display 27 and increasing the compression ratio in a case where the signal component distribution range is wide, it is possible to appropriately set the compression ratio according to the characteristics of the sound.

The area corresponding to the colored portion 37 may be displayed by shading or the like. Furthermore, only the side 36 may be displayed, and the information regarding the compressor is only required to be information including at least the operation start point of the compressor. Furthermore, in the second embodiment, adjustment similar to that described in the first embodiment may be performed.

3. Modifications

The plurality of embodiments of the present disclosure has been specifically described above, but the contents of the present disclosure are not limited to the above-described embodiments, and various modifications can be made based on the technical idea of the present disclosure.

In the above-described embodiment, the timing at which the peak level integration processing unit starts integration can be set to an arbitrary timing. For example, in a case where the display control device 1 is applied to an imaging device, the peak level integration processing unit may start integration at the timing at which imaging (including recording of sound) is started, the timing at which the level of recorded sound is changed, the timing at which video is captured, the timing at which the power supply is turned on (may be before recording is started), or the like. Furthermore, as described in the second embodiment, the peak level integration processing unit may start integration after the setting regarding the compression of the dynamic range is made. Furthermore, data to be integrated can be set as appropriate. For example, all data after the start of integration may be integrated, or data acquired in a period before a predetermined period from the present may be integrated.

The result of integration by the peak level integration processing unit may be reset depending on predetermined processing. Then, from the reset timing, the peak level integration processing unit may start integration again to reacquire the sound pressure level distribution. The reset is performed, for example, depending on processing in which the user performs predetermined operation with the operation input unit 17. Therefore, it is possible to acquire the sound pressure level distribution of the sound even in a case where the characteristics of the sound to be recorded change significantly, and similarly to the above-described embodiment, it is possible to make an appropriate setting corresponding to the sound characteristics.

The configuration according to the display control device can be changed as appropriate. For example, the display control device may have a configuration without the display unit. In this case, the display unit may be a display unit of a terminal such as a smartphone held by the user, and the display in the above-described embodiment may be performed on the display unit. Furthermore, the display control device may have a configuration without the recording unit. Then, digital sound data may be recorded in an external recording device (cloud server, personal computer, smartphone, or the like).

The display in the above-described embodiment can be changed as appropriate. For example, in the above-described embodiment, the example has been described in which the sound pressure level distribution is displayed along the vertical direction; however, the sound pressure level distribution may be displayed along the horizontal direction. Furthermore, the shape of the frame is not limited to a rectangular shape, and may be elliptical shape or the like. Furthermore, the peak level meter may not be displayed. Furthermore, a frame may be displayed that is automatically set for the user's reference in a device. Moreover, it may be allowed to select on/off of the display in the above-described embodiment as modes.

The quantization bit depth in the above-described embodiment is an example, and the present disclosure can be applied even in the case of another quantization bit depth (for example, 32 bits).

The functions described in the above-described embodiments can be implemented in any form such as a method, a program, and a recording medium on which the program is recorded. Furthermore, the program may be downloadable. Then, another device (for example, an imaging device or a smartphone) may download and install the program to implement the functions described in the embodiments.

The configurations, methods, processes, shapes, materials, numerical values, and the like in the embodiment described above are merely examples, and different configurations, methods, processes, shapes, materials, numerical values, and the like may be used as necessary. The above-described embodiment and modifications can be combined as appropriate.

The present disclosure can also adopt the following configurations.

(1)
A display control device including
a control unit that displays a sound pressure level distribution of predetermined sound data and a recordable range corresponding to a quantization bit depth during recording of the sound data on a display unit.

(2)
The display control device according to (1), in which
the control unit acquires the sound pressure level distribution.

(3)
The display control device according to (2), in which
the control unit resets and reacquires the sound pressure level distribution depending on predetermined processing.

(4)
The display control device according to any of (1) to (3), in which
the sound pressure level distribution indicates frequency of occurrence of peak levels per unit time of sound data.

(5)
The display control device according to (4), in which
the control unit displays the frequency of occurrence of the peak using a color or graphed.

(6)
The display control device according to any of (1) to (5), in which
the control unit displays the sound pressure level distribution and the recordable range at respective positions close to each other.

(7)
The display control device according to (6), in which
the control unit displays another recordable range corresponding to a higher quantization bit depth than the quantization bit depth to cause the other recordable range to be superimposed on the recordable range.

(8)
The display control device according to any of (1) to (7), in which
the control unit displays information regarding a compressor on the display unit.

(9)
The display control device according to (8), in which
the information regarding the compressor includes at least information regarding an operation start point of the compressor.

(10)
The display control device according to (8) or (9), in which
the control unit displays the recordable range and the information regarding the compressor with a figure whose shape changes.

(11)
The display control device according to any of (1) to (10), in which
the control unit displays the recordable range with a rectangular frame.

(12)
The display control device according to (11), in which
facing sides of the frame correspond to a full scale and a noise floor, respectively.

(13)
The display control device according to (11) or (12), in which
the control unit displays information regarding a compressor in the frame.

(14)
The display control device according to any of (1) to (13), further including
a recording unit that records sound data corresponding to an inside of the recording range.

(15)
The display control device according to any of (1) to (14), further including
the display unit.

(16)
A display control method including
displaying a sound pressure level distribution of predetermined sound data and a recordable range corresponding to a quantization bit depth during recording of the sound data on a display unit, by a control unit.

(17)
A program causing a computer to execute a display control method including
displaying a sound pressure level distribution of predetermined sound data and a recordable range corresponding to a quantization bit depth during recording of the sound data on a display unit, by a control unit.

REFERENCE SIGNS LIST

1 Display control device
11 Microphone

13 DSP
14 Display unit
15 Recording medium
27 Sound pressure level distribution display
32 Frame

The invention claimed is:

1. A display control device comprising
a control unit that displays a sound pressure level distribution of sound data and a recordable range corresponding to a quantization bit depth during recording of the sound data on a display unit.

2. The display control device according to claim 1, wherein
the control unit acquires the sound pressure level distribution.

3. The display control device according to claim 2, wherein
the control unit resets and reacquires the sound pressure level distribution depending on a predetermined processing.

4. The display control device according to claim 1, wherein
the sound pressure level distribution indicates a frequency of occurrence of peak levels per unit time of the sound data.

5. The display control device according to claim 4, wherein
the control unit displays the frequency of occurrence of the peak levels per unit time via a color or a graph.

6. The display control device according to claim 1, wherein
the control unit displays the sound pressure level distribution and the recordable range at respective positions close to each other.

7. The display control device according to claim 6, wherein
the control unit displays another recordable range corresponding to a higher quantization bit depth than the quantization bit depth to cause the other recordable range to be superimposed on the recordable range.

8. The display control device according to claim 1, wherein
the control unit displays information regarding a compressor on the display unit.

9. The display control device according to claim 8, wherein
the information regarding the compressor includes at least information regarding an operation start point of the compressor.

10. The display control device according to claim 8, wherein
the control unit displays the recordable range and the information regarding the compressor with a figure whose shape changes.

11. The display control device according to claim 1, wherein
the control unit displays the recordable range with a rectangular frame.

12. The display control device according to claim 11, wherein
facing sides of the rectangular frame correspond to a full scale and a noise floor, respectively.

13. The display control device according to claim 11, wherein
the control unit displays information regarding a compressor in the rectangular frame.

14. The display control device according to claim 1, further comprising
a recording unit that records the sound data corresponding to an inside of the recordable range.

15. The display control device according to claim 1, further comprising the display unit.

16. A display control method comprising
displaying a sound pressure level distribution of sound data and a recordable range corresponding to a quantization bit depth during recording of the sound data on a display unit, by a control unit.

17. A non-transitory computer-readable medium having stored thereon computer-executable instructions that, when executed by an information processing apparatus, cause the information processing apparatus to execute operations, the operations comprising:
displaying a sound pressure level distribution of sound data and a recordable range corresponding to a quantization bit depth during recording of the sound data on a display unit, by a control unit; and
displaying information regarding a compressor on the display unit,
wherein the recordable range and the information regarding the compressor are displayed with a figure whose shape changes.

* * * * *